United States Patent Office 3,836,672
Patented Sept. 17, 1974

3,836,672
TOPICAL ANTIFUNGAL 1,3-DIOLS
Donald L. Wright, 35 E. 75th St., New York, N.Y. 10021, and John W. Frankenfeld, 2 Ballinswood Road, Atlantic Highlands, N.J. 07716
No Drawing. Filed Nov. 11, 1971, Ser. No. 197,931
Int. Cl. A01l 13/00
U.S. Cl. 424—343                                4 Claims

ABSTRACT OF THE DISCLOSURE

The present invention is based on the discovery that certain 1,3-diols and mono-esters of certain 1,3-diols are effective in controlling microorganisms associated with infections in humans and animals. Anti-microbial preparations having as the active ingredient these specified diols, monoesters of the diols or mixtures thereof are provided. The active ingredient in these preparations is generally present in an amount ranging from about 0.5 to about 10 weight percent based on the total weight of the preparation.

BACKGROUND OF THE INVENTION

The present invention relates generally to the treatment of infections in humans and animals by controlling microorganisms associated with the infectious condition. Particularly, the present invention relates to the use of polyols and their esters in topical, dermatological and related preparations.

Many materials are known which when applied to the skin effectively reduce the growth of microorganisms such as bacteria and fungi, particularly such microorganisms which may be associated with an infection. These materials are generally incorporated in inert carriers for numerous reasons including ease of application and to avoid possible exposure of the infected area to an unusually high concentration of active material.

Many known bactericides and fungicides have a relatively high level of mammalian toxicity and therefore must be used with considerable care. Some fungicides and bactericides in effective concentrations are irritating to the skin of the subject. Others, while being non-irritating may be absorbed by the subject. Many of these known materials are relatively expensive and difficult to prepare. Frequently, they are difficult to incorporate in an inert carrier material. For these and other reasons there is need for new and improved preparations for the treatment of infections in humans and animals.

SUMMARY OF THE INVENTION

It has now been discovered that certain aliphatic diols and their mono-esters are effective in controlling microorganisms associated with infections in humans and animals. Among the key features of the diols of the present invention is that they contain hydroxy groups on the first and third carbon atoms in the molecule. Other aspects of the diols and the mono-esters derived from these diols will be explained in greater detail below. Suffice it to say that these compounds have advantages over current bactericides and fungicides, not only because of their increased effectiveness but also because of their low level of mammalian toxicity.

One embodiment of the present invention is a method of controlling infections in humans and animals which comprises treating the surface of the infected area with an effective amount of a compound selected from the group consisting of linear diols, mono-esters of linear diols and mixtures thereof; the diols having from about 7 to about 15 carbon atoms in the molecule and hydroxy groups on the first and third carbon atoms, while the mono-esters have acyl groups of from about 2 to about 10 carbon atoms.

In yet another embodiment of the present invention, a topical preparation for treatment of infections in humans and animals is provided comprising an inert carrier and an active ingredient selected from the group consisting of linear 1,3-diols, mono-esters of said 1,3-diols and mixtures thereof. The linear 1,3-diols have from about 5 to 15 carbon atoms in the molecule. The said monoesters of these 1,3-diols have an acyl group of about 2 to about 10 carbon atoms. These and other features of the present invention will be apparent from the detailed description and the claims which follow.

DETAILED DESCRIPTION OF THE INVENTION

As indicated previously, the present invention is based on the discovery that particular 1,3-diols and their monoesters are especially useful for treatment of infections in humans and animals because of their effectiveness against various health implicated bacteria and fungi and because they are relatively very safe to use.

The linear 1,3-diols of the instant invention contain from about 5 to 15 carbon atoms in the molecule and preferably from about 7 to about 10 carbon atoms in the molecule. As indicated previously, the diols of the present invention contain hydroxy groups on the first and third carbon atoms of the molecule. It is the 1,3-hydroxy configuration which renders these compounds very useful in the treatment of microorganisms associated with infections. Generally, diols with hydroxyl groups in other positions on the carbon chain are toxic and therefore must be used with great care. Also 1,3-diols with aliphatic side chains have a higher order of toxicity than the compounds of the instant invention.

In addition to the 1,3-diols of the present invention being non-toxic, they also have certain other advantages making them particularly useful as an active ingredient in controlling growth of microorganisms. For example, these materials are particularly stable and have a long storage and shelf life and are readily incorporated or dispersed in creams, ointments and the like. They are effective as anti-microbial agents over a wide range of conditions and not inactivated by high or low pH or by surfactants, making them easy to formulate in topical preparations.

When using 1,3-diols, per se, it is preferred that the number of carbon atoms in the molecule be from 7 to 10. However, when a mono-ester of the 1,3-diol is used, the number of carbon atoms in the diol portion of the molecule will range from about 4 to about 10 carbon atoms while the acyl group, from which the ester is derived, will have from 2 to about 12 carbon atoms in a straight chain, and preferably from about 3 to about 9 carbon atoms. These mono-esters are either in the 1 or the 3 position. Such esters have molecular weights ranging generally from about 132 to about 244.

A summary of compounds particularly useful in the practice of the present invention, along with their physical properties, is presented in Table I.

TABLE I

| Compound | Boiling point, °C. flash, mm.Hg. | Taste, odor, etc. |
|---|---|---|
| 1,3-heptanediol | 90°/0.5 | Colorless, slight musty odor slight bitter taste. |
| 1,3-octanediol | 87–89/0.3 | Do. |
| 1,3-nonanediol | 126/1.1 | Do. |
| 1,3-decanediol | 30–31 | Do. |
| 1,3-undecanediol | 41–42 | Do. |
| 1,3-butanediol monooctanoate. | 29–30 | Colorless, odorless, slight bitter taste. |
| 1,3-octanediol monopropionate. | 83–86/0.3 | Colorless, pungent odor, bitter taste. |
| 1,3-nonanediol monopropionate. | 98–100/0.5 | Do. |
| 1,3-hexanediol monopalmitate. | 124–126/0.2 | Colorless, odorless, tasteless. |
| 1,3-hexanediol monoacetate. | 59–62/0.15 | Colorless, pungent odor, sharp, bitter taste. |
| 1,3-heptanediol monooctanoate. | 85–90/1.0 | Colorless, odorless, slight bitter taste. |

It is not intended that the present invention be limited to the specific compounds set forth in Table I. Of the compounds listed in the table, however, 1,3-heptanediol, 1,3-octanediol and 1,3-nonanediol are particularly desirable diols and 1,3-butanediol monooctanoate and 1,3-octanediol monopropionate are particularly desirable esters for use in the instant invention.

While the diols may be prepared by any satisfactory method, the following methods are very satisfacsory for their preparation.

The Reformatsky Reaction followed by reduction:

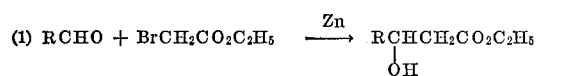

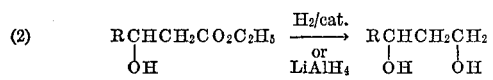

The Prins Reaction of formaldehyde and the appropriate alpha olefin or mixture of alpha olefins.

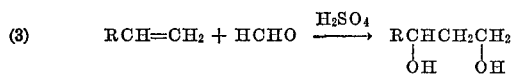

The esters are made by reacting 1,3-diols with acids or acid derivatives that contain from 2 to 12 carbon atoms in the molecule, preferably from 3 to 9 carbon atoms. In general, the esters will have the following configuration.

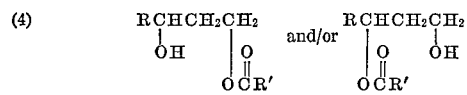

wherein R represents a straight chain alkyl group containing from 1 to 7 carbon atoms and R' represents a straight chain alkyl group having from 1 to 9 carbon atoms. Compounds may be varied as long as the hydroxy compounds are on the first and third carbon atoms. The esters generally have molecular weights in the range of from about 132 to about 244. As indicated previously, these esters are conveniently prepared from the diols by reaction with either an appropriate acid, or acid derivative such as an acid anhydride or acid chloride.

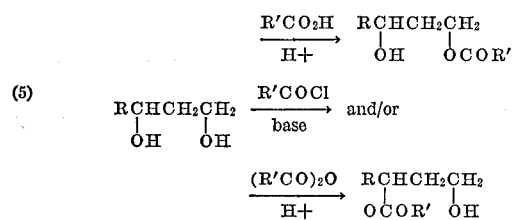

In order to further illustrate the invention, various tests were carried out, the results of which are described in the following examples and tables of data. In Table II are summarized the results of toxicity measurements. These studies were conducted with rats.

TABLE II

Acute Toxicity of Various Polyols and Poly Esters

| Polyols: | Oral L/D$_{50}$ (7 days),[a][b] ml./kg. |
|---|---|
| 1,3-pentanediol | >20 |
| 2,4-pentanediol | (c) |
| 1,5-pentanediol | 2 |
| 1,3-hexanediol | >20 |
| 2,5-hexanediol | 5 |
| 1,6-hexanediol | 5 |
| 1,3-heptanediol | >20 |
| 1,3-octanediol | >20 |
| 1,3-nonanediol | >20 |
| 1,3-decanediol | >20 |
| 1,3-undecanediol | >20 |
| 1,3-butanediol-monooctanoate | >20 |
| 1,3-hexanediol-monoacetate | 10–15 |
| 1,3-hexanediol-monopropionate | >20 |
| 2,5-hexanediol-monoproprionate | (c) |
| 1,3-octanediol-monopropionate | >20 |
| 2-ethyl-1,3-hexanediol | [d] 4.2 |

[a] Single dose in rats.
[b] LD$_{50}$=lethal dose for 50% kill.
[c] No LD$_{50}$ obtained; rats died at lowest level tried.
[d] Merck Index.

It is apparent from the above data that the positioning of the hydroxyl groups has a very significant effect on the toxicity of these compounds. Having hydroxyl groups on the first and third carbon atoms of a normal hydrocarbon chain is sufficient to reduce the toxicity and to render the compounds completely safe for products to be used in contact by the humans and animals and to be stored with complete safety. Thus, there exists no danger of these products causing harm by accidental use by adults or by children.

LD$_{50}$ values are a common measure of the toxicity of the compound. These LD$_{50}$ values represent the lethal dose for a 50% kill of the animals tested per unit weight of the animals. The higher the LD$_{50}$ value the lower the toxicity. The data in Table II established that the 1,3-configurations of the diols are the least toxic. The LD$_{50}$ values are significantly higher in compounds possessing the 1,3-structural feature. The LD$_{50}$ values given in Table II were obtained by giving test animals graded single doses of the test compounds orally and observing them for one week. The number of deaths in each group was noted and the dose required for 50% kill taken as the LD$_{50}$ value. In many cases no death occurred even at the 20 grams per kilogram level (about as much as one can give a rat in one dose), hence, the basis of the greater than 20 values shown in the table.

The amount of 1,3-diol and 1,3-diol ester or mixtures thereof that may be used in the practice of the present invention varied widely depending upon the particular diol or diol ester employed and the specific microorganism to be controlled. As already indicated, one aspect of the present invention, topical infections can be treated by applying to the surface area of the infection effective amounts of compounds selected from the 1,3-diols, monoesters of 1,3-diols and mixtures thereof as described herein. Generally, however, these materials will be incorporated in a topical preparation or dermatological cosmetic containing inert creams, salves, ointments, oils or aerosol propellants, and the amount incorporated will range from 0.5 to 10 wt. percent of the total weight of the preparation. Preferably, the level of these materials in the preparations will range from 1 to 3 wt. percent.

Selection of the diol, diol-ester or mixture thereof to be used in the preparation or method of treating topical infection of the instant invention will depend on the type and site of the infection to be treated. For example, in the case of monilial vaginitis, an infection caused by *Candida albicans*, it is desirable to control fungal organism with minimum disturbance of the normal vaginal bacterial flora. For such application, a diol ester will be used since the esters are much more effective against fungi than bacteria, while the 1,3-diols themselves exhibit more broad-spectrum activity. An especially valuable active ingredient for the treatment of fungal vaginitis is a 50–50 mixture of 1,3-nonanediol and 1,3-butanediol monooctanoate. This mixture is effective against fungi at levels where it is only mildly inhibitory to bacteria. Below are typical cream and spray formulations incorporating a mixture of 1,3-diol and 1,3-diol mono-esters.

FORMULA 1.—CREAM PREPARATION

| Compound | Weight percent | Weight percent range |
|---|---|---|
| 50–50 mixture of 1,3-butanediol monooctanoate and 1,3-nonanediol | 2.5 | 1–5 |
| Hydrogel | 45.0 | |
| Hydrous wool fat | 5.0 | |
| Liquid petrolatum | 15.0 | |
| White petrolatum, q.s to make | 100.0 | |

FORMULATION 2.—SPRAY FUNGICIDE

| Compound | Percent by weight | Range |
|---|---|---|
| 50–50 mixture of 1,3-butanediol monooctanoate and 1,3-nonanediol | 2.5 | 1–5 |
| Light liquid petrolatum | 67.5 | |
| Inert ingredients [1] | 30.0 | |

[1] Includes propellant.

In application where the anti-microbial agent does not have to be a specific to a particular fungi or bacteria, as in the treatment of skin diseases such as athlete's foot, ring worm and the like, diols such as 1,3-nonanediol would be employed as the active ingredient. Below are listed some typical formulations incorporating 1,3-nonanediol as a lotion and anti-fungal ointment.

FORMULATION 3.—ANTI-FUNGAL LOTION

| Compound | Weight percent | Weight percent range |
|---|---|---|
| 1,3-nonanediol | 3.0 | 2–5 |
| Sodium lauryl sulfate | 1.0 | |
| Cetyl alcohol | 4.0 | |
| Light mineral oil | 16.0 | |
| Water, q.s to make | 100.0 grams | |

FORMULATION 4.—ANTI-FUNGAL OINTMENT

| Compound | Weight percent | Weight percent range |
|---|---|---|
| 1,3-nonanediol | 3.0 | 2–5 |
| Cetyl alcohol | 12.0 | 10–13 |
| White wax | 1.0 | |
| Propylene glycol | 10.0 | |
| Sodium lauryl sulfate | 2.0 | |
| Water | 72.0 | |
| Total | 100.0 | |

The effectiveness of representative 1,3-diols and 1,3-diol esters in inhibiting the growth of fungi is shown in Table III.

TABLE III.—ANTI-FUNGAL PROPERTY OF POLYOLS AND POLYOL ESTERS

| Compound | Minimum effective concentration (percent) vs.— | | | |
|---|---|---|---|---|
| | C. albicans | A. niger | P. roquefortii | A. flavus |
| 1,3-butanediol | NT | + | NT | + |
| 1,3-pentanediol | NT | + | NT | *+ |
| 1,3-heptanediol | + | 0.2 | 0.05 | *0.2 |
| 1,3-octanediol | 0.2 | 0.2 | NT | NT |
| 1,3-nonanediol | 0.05 | 0.05 | NT | NT |
| 1,3-butanediol monooctanoate | 0.05 | 0.05 | 0.05 | NT |
| 1,3-octanediol monopropionate | NT | 0.05 | 0.05 | *0.2 |
| 1,3-nonanediol monopropionate | 0.05 | 0.05 | NT | NT |
| Mixture of 1,3-nonanediol (50% and 1,3-butanediol monooctanoate (50%) | 0.004 | 0.008 | NT | NT |

Symbols: NT=Not tested. +=Not effective at 2%. *=Lowest level tested.

Data in Table III illustrates the effectiveness of certain diols and diol esters and the fact that for optimum effectiveness the diols must contain at least 7 carbon atoms. On the other hand, the diol esters may contain as few as four carbon atoms in the diol portion of the molecules so long as the acyl group is long enough to provide a molecular weight of 132. Conversely, the diol portion may contain as many as ten carbon atoms so long as the acyl portion is small enough to restrict the molecular weight to 244 or less. Diol esters with molecular weights outside of this range are either not effective or they possess physical properties rendering them difficult to incorporate into antimicrobial preparations.

As will be readily appreciated by one skilled in the art, inert carriers can be used in topical preparation and dermatological cosmetics. Typical carriers include stearic acid, petrolatum, beeswax, alcohol and glycerol. When a material of paste or cream-like consistency is being prepared these generally incorporate water and essential oils, emulsifier or alcohol, lanolin, or spermaceti. Propellant type or aerosol materials generally utilize as an inert carrier propylene glycol or ethylene glycol. Coloring matter, perfumes and other additives, of course, may be incorporated into the preparation in accordance with the practice of the instant invention.

What is claimed is:

1. A method for inhibiting the growth of fungi on human skin comprising applying a linear aliphatic 1,3-diol to the fungi on said skin in effective amounts, said 1,3-diol having from 7 to about 15 carbon atoms in the molecule.

2. The method of claim 1 wherein said diol has from 7 to 10 carbon atoms in the molecule and hydroxy groups on the first and third carbon atoms.

3. The method of claim 1 wherein said diol is 1,3-heptanediol.

4. The method of claim 1 wherein said diol is 1,3-nonanediol.

References Cited

Chemical Abstracts, Vol. 55 (1961), p. 5334d.
Chemical Abstracts, Vol. 60 (1964), p. 3993A.

VINCENT D. TURNER, Primary Examiner

U.S. Cl. X.R.
424—311